United States Patent [19]

Kleine et al.

[11] 4,253,535

[45] Mar. 3, 1981

[54] NOVELTY MOTOR VEHICLE

[76] Inventors: Joseph Kleine; Michael Kleine; John Kleine; Mary Kleine, all of Rte. 3, Box 81A, Troy, Mo. 63379

[21] Appl. No.: 961,737

[22] Filed: Nov. 17, 1978

Related U.S. Application Data

[63] Continuation-in-part of Ser. No. 794,085, May 5, 1977, abandoned.

[51] Int. Cl.³ .............................................. B60K 17/06
[52] U.S. Cl. .................................. 180/6.24; 180/54 F; 180/68 P; 180/73 R; 180/291; 180/313; 280/1.21; 280/1.22; 280/756; 280/759
[58] Field of Search .................... 180/1 R, 70 R, 54 F, 180/55, 68 P, 73 R, 291, 313, 6.24; 280/756, 1.21, 1.22, 759; 248/601; 297/209, 308

[56]      References Cited
         U.S. PATENT DOCUMENTS

| | | | |
|---|---|---|---|
| 1,039,035 | 9/1912 | Desenfants | 180/1 R X |
| 1,247,674 | 11/1917 | Hankinson | 280/756 |
| 1,308,425 | 7/1919 | Johnson | 180/1 R |
| 1,575,075 | 3/1926 | O'Maley | 180/1 R |
| 1,577,743 | 3/1926 | Gossett | 280/756 X |
| 1,594,687 | 8/1926 | Pelton | 180/1 R |
| 1,682,764 | 9/1928 | Mohr | 180/1 R |
| 2,322,477 | 6/1943 | Sjoberg | 180/54 F |
| 2,373,694 | 4/1945 | Lentz | 248/601 X |

Primary Examiner—Stephen G. Kunin
Assistant Examiner—Terrance L. Siemens
Attorney, Agent, or Firm—Daniel Jay Tick

[57]      ABSTRACT

A novelty motor vehicle has a pair of rear wheels of diameter greater than that of the front wheels. An engine is mounted on the rear of the chassis aft of the rear wheels. Weights are mounted on the rear of the chassis aft of the rear wheels. A transmission is provided. A special gear box is mounted on the chassis and coupled to the engine. Two drive shafts are provided; one from the transmission to the special gear box for rotating the gears and the other from the special gear box to the rear end for driving the vehicle slower. An independent hand brake system selectively brakes either of the rear wheels to turn the vehicle about the braked wheel when the front wheels are on the ground or in the air due to the weight on the chassis aft of the rear wheels.

11 Claims, 3 Drawing Figures

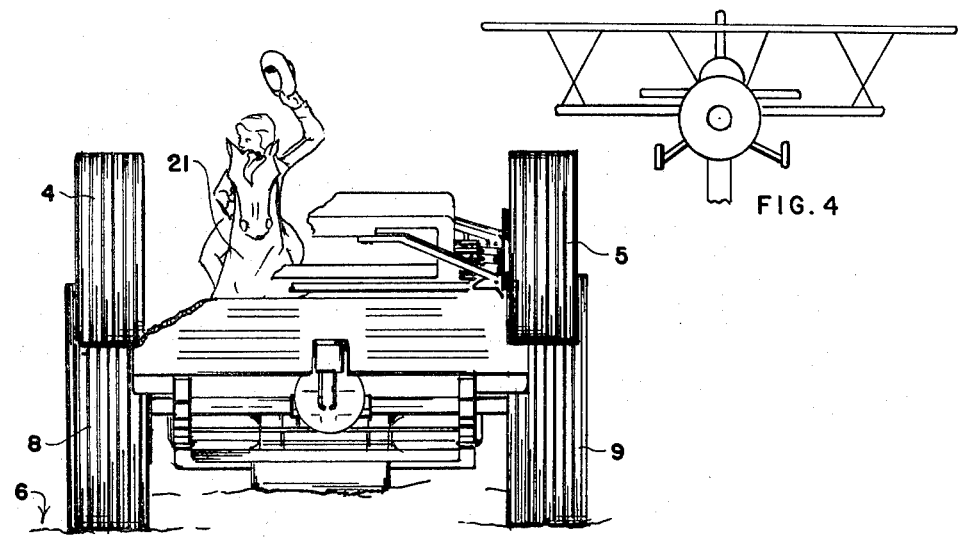
FIG. 1
FIG. 4
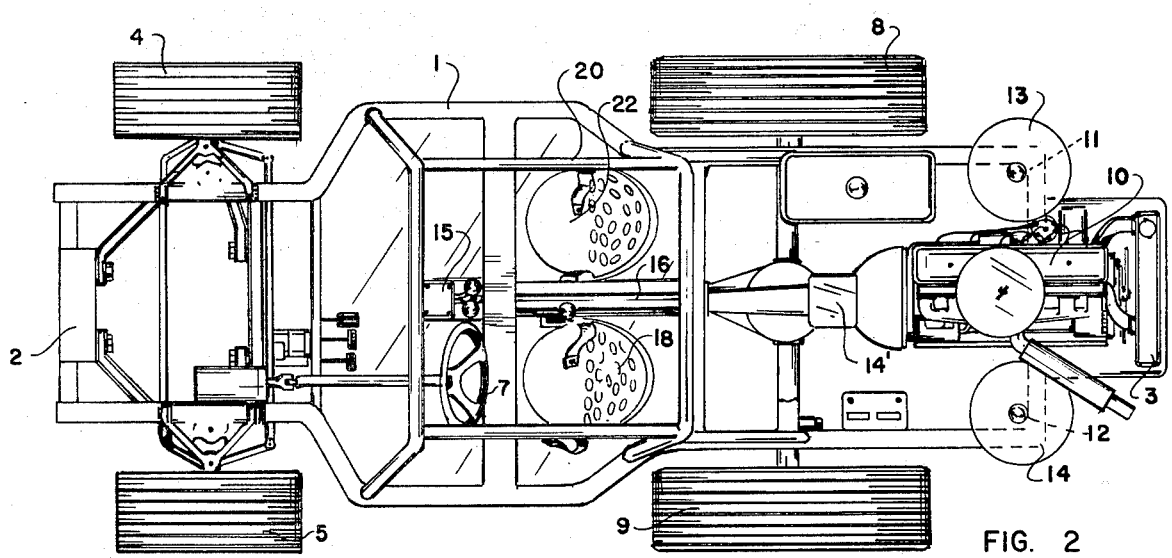
FIG. 2
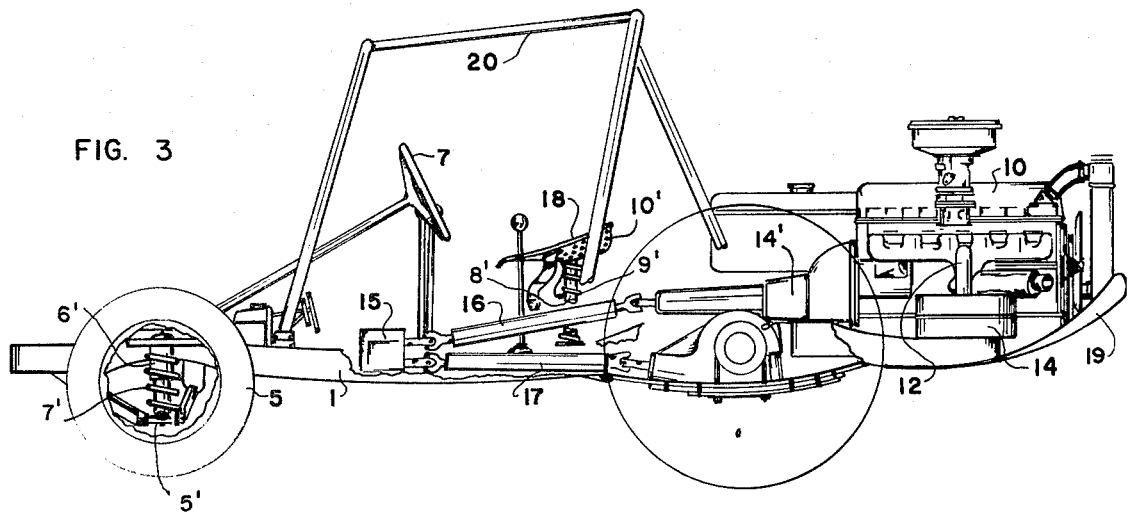
FIG. 3

NOVELTY MOTOR VEHICLE

BACKGROUND OF THE INVENTION

This is a continuation-in-part of application Ser. No. 794,085, filed May 5, 1977, now abandoned, for Novelty Motor Vehicle.

The present invention relates to a novelty motor vehicle. More particularly, the invention relates to a novelty motor vehicle having a chassis with a front and a rear.

The principal object of the invention is to provide a novelty motor vehicle which performs all types of acrobatic tricks for the amusement and entertainment of onlookers, viewers and riders in and on the vehicle.

An object of the invention is to provide a novelty motor vehicle of simple structure which performs all types of acrobatic tricks, including rearing up on its rear wheels with its front wheels high up in the air and turning about either of its rear wheels.

Another object of the invention is to provide a novelty motor vehicle which functions efficiently, effectively and reliably as an amusement device which is raisable and lowerable in the air as it spins, movable at very slow or very rapid speeds, controllable to a complete stop while raised in the air, and backable or reversible while raised in the air.

Still another object of the invention is to provide a novelty motor vehicle of very high maneuverability, which can travel at speeds ranging from less than one mile per hour to 40 to 80 miles per hour.

Yet another object of the invention is to provide a novelty motor vehicle of simple structure which is capable of moving very slowly, coming to a stop, or starting up, and continuing to move at such slow speed, slower than a person's slow walk.

Another object of the invention is to provide a novelty motor vehicle which can back up, spin in both forward and backward directions, and both spin and raise up simultaneously, or both spin and lower while moving forward or backward.

Still another object of the invention is to provide a novelty motor vehicle which is more maneuverable than a horse.

Another object of the invention is to provide a novelty motor vehicle which is capable of travelling any distance while raised in the air.

Yet another object of the invention is to provide a novelty motor vehicle which can move forward and backward while in the air and while rising and lowering.

The vehicle of the invention may be used to round up cattle, since it is capable of outmaneuvering and outrunning a horse. It may thus also be used in rodeo-type contests.

BRIEF SUMMARY OF THE INVENTION

In accordance with the invention, a novelty motor vehicle having a chassis with a front and a rear, comprises a front suspension axle. A pair of front wheels have a predetermined diameter dependent upon the size of the vehicle and are rotatably mounted on the front suspension axle of the chassis. A steering system is coupled to the front wheels for turning the wheels to steer the vehicle when the wheels are on a supporting surface. The steering system includes a steering wheel. A pair of rear wheels have a diameter greater than the predetermined diameter and are rotatably mounted on the rear of the chassis. An engine is mounted on the rear of the chassis farther from the front of the chassis than the rear wheels. A transmission is coupled to the engine. Adjustable weights are mounted on the rear of the chassis on both sides of the engine farther from the front of the chassis than the rear wheels. A special gear box is mounted on the chassis and coupled to the transmission. Two drive shafts are provided. One of the drive shafts extends from the transmission to the special gear box. The other of the drive shafts extends from the special gear box to the rear end to move the vehicle more slowly than a person's slow walk. A stool type driver's seat is mounted on the chassis at the steering wheel. A brake system controls the braking of the vehicle. An independent hand brake system selectively brakes either of the rear wheels to turn the vehicle about the braked wheel when the front wheels are on the ground or in the air due to the weight of the chassis aft of the rear wheels.

The vehicle has a radiator. Metal protective skids are affixed to the chassis and extend beneath the engine and the radiator for protecting the engine and the radiator from damage when the front wheels are in the air.

A replica of an animal, an animate object, an inanimate object or a thing is mounted on the chassis.

A pair of spaced upright substantially vertically positioned pipes are mounted on the rear of the chassis aft of the rear wheels. A plurality of annular weights are mounted on the pipes.

BRIEF DESCRIPTION OF THE DRAWINGS

In order that the invention may be readily carried into effect, it will now be described with reference to the accompanying drawings, wherein:

FIG. 1 is a front view of an embodiment of the novelty motor vehicle of the invention, rearing up with its front wheels in the air;

FIG. 2 is a top view of the embodiment of FIG. 1;

FIG. 3 is a side view of the embodiment of FIG. 2; and

FIG. 4 is a view of a replica of an inanimate object mountable on the chassis of the novelty motor vehicle of the invention.

DETAILED DESCRIPTION OF THE INVENTION

The novelty motor vehicle of the invention has a chassis 1 with a front 2 and a rear 3 (FIG. 2).

The vehicle has a pair of front wheels 4 and 5 of predetermined diameter rotatably mounted on the front suspension axle of the chassis 1. A steering system of any suitable type is coupled to the front wheels 4 and 5 for turning said wheels to steer the vehicle when said wheels are on a supporting surface 6 (FIG. 1). The steering system includes a steering wheel 7 (FIGS. 2 and 3).

The first suspension axle has a wheel mounting member 5'. A shock absorber 6' extends between, and is coupled to, the chassis 1 and the wheel mounting member 5', as shown in FIG. 3. A coil spring 7' (FIG. 3) is mounted around the shock absorber 6' and has a first end abutting the chassis 1 and a spaced opposite second end abutting the wheel mounting member 5'.

A pair of rear wheels 8 and 9 (FIGS. 1 and 2) of a diameter greater than the predetermined diameter are rotatably mounted on the rear of the chassis 1.

An engine 10 of any suitable type is mounted on the rear of the chassis 1 aft of the rear wheels 8 and 9. That is, the engine 10 is mounted farther from the front 2 of the chassis than the rear wheels 8 and 9.

A pair of spaced, upright, substantially vertically positioned pipes 11 and 12 (FIG. 2) are mounted on the rear of the chassis 1 aft of the rear wheels 8 and 9. Weights 13 and 14 of disc or annular type configuration are mounted on the pipes 11 and 12, respectively, as shown in FIG. 2. The combination of the weights 13 and 14 and the weight of the engine 10 causes the vehicle to rear up on its rear wheels 8 and 9 with its front wheels 4 and 5 off the ground when the vehicle is moving and permits the vehicle to travel for any distance while raised in the air. It moves forward or backward while in the air, and while rising and lowering. Thus, any magnitude of weights 13 and 14, to a desired extent, may be mounted on the pipes 11 and 12 to attain the desired effect. If the operator of the vehicle presses in the clutch while the vehicle is backing up and then applies pressure to the foot brake to stop the vehicle while it is backing up, the vehicle rears up.

A transmission 14' is coupled to the engine 10. A special gear box 15 (FIGS. 2 and 3) is mounted on the chassis 1 and coupled to the transmission 14'. Two drive shafts 16 and 17 are provided and the transmission 14' is at the rear of said drive shafts. The drive shaft 16 extends from the transmission to the special gear box 15 and rotates the gears. The other drive shaft 17 extends from the special gear box 15 to the rear end and makes the vehicle move slower than a person's slow walk.

The special gear box 15 may have high or low speed gears, or both, gears for a standard drive of about 80 miles per hour, or underdrive at about 40 miles per hour. The special gear box 15 may comprise the gear box of any suitable automotive vehicle such as, for example, one which operates the power take off of a tractor. The gears of the gear box 15 are geared down to assist in enabling the vehicle of the invention to move slowly. The special gear box 15 is coupled between the transmission and the rear end and provides slow motion of the vehicle of the invention.

If the gears of the gear box 15 are reversed, the vehicle of the invention may move very fast. The vehicle of the invention can move 40 miles per hour in high gear and 80 miles per hour if the gears are reversed. The gear ratio of the special gear box 15 is about 2.59:1, since there are 44 teeth on one gear and 17 teeth on the other.

The vehicle may be turned, while the front wheels 4 and 5 are up in the air or on the ground, about either of its rear wheels, by braking the wheel about which it is desired to be turned and permitting the other wheel to rotate. To accomplish this, an independent hand brake system selectively brakes either of the rear wheels 8 and 9, under the control of the operator of the vehicle, to turn the vehicle about the braked wheel when the front wheels are on the ground or in the air due to the weight on the chassis 1 aft of said rear wheels. This results in the vehicle literally "turning on a dime."

A brake system of any suitable type is used to control the braking of the vehicle when all four wheels are on the ground, except when the independent hand brake system is used.

A stool type driver's seat 18 is mounted on the chassis 1 at the steering wheel 7 (FIGS. 2 and 3). The driver's seat 18 does not have a back, but has a safety belt, so that the driver or operator remains secured in the seat during the antics of the vehicle without injury to him or her. The driver's seat comprises a post 8' extending substantially upright from the chassis 1 (FIG. 3). A coil spring 9' is mounted around the post 8' (FIG. 3) and extends therebeyond. A seat member 10' is affixed to the spring 9'.

Metal protective skids, of which a skid 19 is shown in FIG. 3, are affixed to the chassis 1 and extend beneath the engine 10 and the radiator 3 for protecting said engine and said radiator from damage when the front wheels 4 and 5 are in the air.

A roll bar frame 20 of steel bars is affixed to the chassis and extends over the area of the operator and passenger of the vehicle to prevent injury to passengers of the vehicle in the event of a mishap.

In the embodiment of FIG. 1, a replica of a horse 21 is mounted on the chassis in the area which would normally be occupied by the passenger seat. The replica may be any animal, inanimate object, animate object, thing, or the like, such as for example, a kite, space ship, airplane, bird, dragon, bumble bee, or the like. An inanimate object such as, for example, a miniature airplane, shown in FIG. 4, may be mounted on the chassis, instead of the horse 21. In the embodiment of FIG. 2, a passenger seat 22 of the same structure as the driver's seat 18 is provided.

Hydraulic cylinders may be installed beneath the chassis to raise the front of the vehicle while the front wheels remain on the ground. This may be accomplished with a scissors type frame, as an alternative to the usual frame in order to cushion the drop of the vehicle. This alternative makes the vehicle of the invention especially attractive for use in amusement parks, since a rider's or passenger's seat or replica of something may then be provided at the very front of the vehicle.

In a preferred embodiment, the vehicle of the invention is driven by a six cylinder engine, through the three speed transmission 14', then through the special gear box 15, which is geared down to a ratio of approximately 2.59:1, and then through the rear end, which further slows it down in a ratio of 46:13. The low gear ratio of the transmission 14' is 2.57:1. The second gear ratio of the transmission is 1.83:1. The high gear ratio of the transmission is 1:1.

It is the combination of the transmission 14', the special gear box 15 and the rear end which provides the overall control of the vehicle of the invention. Normal walking speed is approximately 4 miles per hour. The vehicle of the invention may be driven at one mile per hour and may run for an hour at one mile per hour.

The vehicle of the invention may be used in a new type of ball game similar to polo. A wire screen is placed around the driver to protect him from being struck by the ball. A player sits in a second seat to the right of the driver and braces his feet on an appropriate floorboard. The player is strapped into the seat and attempts to bat the ball.

While the invention has been described by means of a specific example and in a specific embodiment, we do not wish to be limited thereto, for obvious modifications will occur to those skilled in the art without departing from the spirit and scope of the invention.

We claim:

1. A novelty motor vehicle having a chassis with a front and a rear, said motor vehicle comprising
   a front suspension axle;
   a pair of front wheels of predetermined diameter dependent upon the size of the vehicle and rotatably mounted on the front suspension axle of the chassis;

steering means coupled to the front wheels for turning said wheels to steer the vehicle when said wheels are on a supporting surface, said steering means including a steering wheel;

a pair of rear wheels of diameter greater than the predetermined diameter rotatably mounted on the rear of the chassis;

an engine mounted on the rear of the chassis farther from the front of the chassis than the rear wheels;

a transmission coupled to the engine;

adjustable weights mounted on the rear of the chassis on both sides of the engine farther from the front of the chassis than the rear wheels;

a special gear box mounted on the chassis and coupled to the transmission;

two drive shafts, one of said drive shafts extending from the transmission to the special gear box and the other of said drive shafts extending from the special gear box to the rear end to move the vehicle more slowly than a person's slow walk;

a stool type driver's seat mounted on the chassis at the steering wheel, said driver's seat comprising a post extending substantially upright from the chassis, a coil spring around the post and extending therebeyond and a seat member affixed to said spring;

a brake system for controlling the braking of the vehicle; and an independent hand brake system for selectively braking either of the rear wheels to turn the vehicle about the braked wheel when the front wheels are on the ground or in the air due to the weight of the chassis aft of the rear wheels.

2. A novelty motor vehicle as claimed in claim 1, further comprising a radiator and metal protective skids affixed to the chassis and extending beneath the engine and the radiator for protecting said engine and said radiator from damage when the front wheels are in the air.

3. A novelty motor vehicle as claimed in claim 1, further comprising a replica of an animal mounted on the chassis.

4. A novelty motor vehicle as claimed in claim 1, further comprising a replica of an animate object mounted on the chassis.

5. A novelty motor vehicle as claimed in claim 1, further comprising a replica of an inanimate object mounted on the chassis.

6. A novelty motor vehicle as claimed in claim 1, wherein said front suspension axle comprises a wheel mounting member, a shock absorber extending between and coupled to the chassis and the wheel mounting member and a coil spring around the shock absorber and having a first end abutting said chassis and a spaced opposite second end abutting said wheel mounting member.

7. A novelty motor vehicle having a chassis with a front and a rear, said motor vehicle comprising a front suspension axle;

a pair of front wheels of predetermined diameter dependent upon the size of the vehicle and rotatably mounted on the front suspension axle of the chassis;

steering means coupled to the front wheels for turning said wheels to steer the vehicle when said wheels are on a supporting surface, said steering means including a steering wheel;

a pair of rear wheels of diameter greater than the predetermined diameter rotatably mounted on the rear of the chassis;

an engine mounted on the rear of the chassis farther from the front of the chassis than the rear wheels;

a transmission coupled to the engine;

a special gear box mounted on the chassis and coupled to the transmission;

two drive shafts, one of said drive shafts extending from the transmission to the special gear box and the other of said drive shafts extending from the special gear box to the rear end to move the vehicle more slowly than a person's slow walk;

a stool type driver's seat mounted on the chassis at the steering wheel;

a brake system for controlling the braking of the vehicle;

an independent hand brake system for selectively braking either of the rear wheels to turn the vehicle about the braked wheel when the front wheels are on the ground or in the air due to the weight of the chassis aft of the rear wheels;

a pair of spaced upright substantially vertically positioned pipes mounted on the rear of the chassis on both sides of the engine aft of the rear wheels; and a plurality of annular weights mounted on said pipes whereby said weights are adjustable.

8. A novelty motor vehicle as claimed in claim 7, further comprising a radiator and metal protective skids affixed to the chassis and extending beneath the engine and the radiator for protecting said engine and said radiator from damage when the front wheels are in the air.

9. A novelty motor vehicle as claimed in claim 7, further comprising a replica of an animal mounted on the chassis.

10. A novelty motor vehicle as claimed in claim 7, further comprising a replica of an animate object mounted on the chassis.

11. A novelty motor vehicle as claimed in claim 7, further comprising a replica of an inanimate object mounted on the chassis.

* * * * *